(12) United States Patent
Katsumata et al.

(10) Patent No.: US 6,329,733 B1
(45) Date of Patent: Dec. 11, 2001

(54) RADIAL MAGNETIC BEARING

(75) Inventors: Shin Katsumata; David G. Halsey, both of Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/094,145

(22) Filed: Jun. 9, 1998

(51) Int. Cl.[7] .................................................. H02K 7/09
(52) U.S. Cl. ........................................ 310/90.5; 310/216
(58) Field of Search ........................... 310/90, 90.5, 216, 310/179, 181, 193, 254, 259; 29/596, 598

(56) References Cited

U.S. PATENT DOCUMENTS

| | | | |
|---|---|---|---|
| 3,560,776 | * 2/1971 | Kildishev | 310/214 |
| 4,983,870 | 1/1991 | McSparran | 310/90.5 |
| 5,202,598 | 4/1993 | Katsumata | 310/90.5 |
| 5,528,210 | * 6/1996 | Huang et al. | 335/216 |
| 5,804,896 | * 9/1998 | Takehara et al. | 310/67 R |

* cited by examiner

Primary Examiner—Thomas M. Dougherty
Assistant Examiner—Tran Nguyen
(74) Attorney, Agent, or Firm—Wood, Phillips, VanSanten, Clark & Mortimer

(57) ABSTRACT

A magnetic actuator core is provided for a radial bearing that supports a rotor for rotation about an axis. The magnetic actuator core includes a back iron, and a plurality of poles spaced circumferentially about the axis and extending radially from the back iron. Each of the poles has a taper wherein the circumferential width of the pole tapers from larger to smaller as the pole extends from the back iron.

3 Claims, 3 Drawing Sheets

RADIAL MAGNETIC BEARING

FIELD OF THE INVENTION

This invention relates to magnetic bearings, and more particularly, to radial magnetic bearings having flux paths transverse to the axis of rotation for the rotor.

BACKGROUND OF THE INVENTION

Radial magnetic bearings having flux paths transverse to the axis of rotation for the rotor are well known in the art. Traditionally, such bearings have one or more actuator cores 10, each of which have constant cross-sectional area magnetic flux paths through the poles 12 and back iron 14 of the core 10, as seen in FIG. 1. The core 10 shown in FIG. 1 is conventionally referred to as an E-core because it is E-shaped with three poles 12 extending from the back iron 14, and a coil 16 wound around each of the three poles. The constant cross-sectional area design allows for the coils 16 to be pre-wound and then slid over the poles 12 in the radial direction during assembly. Additionally, providing a coil 16 on each of the poles 12 serves to increase the magnetic flux through each of the poles and to minimize magnetic flux leakage to the poles 12 on neighboring actuator cores 10.

For such magnetic bearings, the maximum load capacity is determined by the bearing force generated when either the actuator cores 10 or the rotor 18 become magnetically saturated. In the traditional, constant cross-sectional area designs such as shown in FIG. 1, saturation typically occurs either in the back iron 14 or in the area of the coils 16. This is undesirable because the bearing force of such magnetic bearings is proportional to the square of the magnetic flux density in the gap G between the rotor 18 and the tips of the core poles 12. For optimum bearing actuator design, the cores 10 should be magnetically saturated close to the gap G between the tips of the poles 12 and the rotor 18.

There is a continuing desire to improve the load capacity of radial magnetic bearings. Further, there is a desire to provide increased load capacity with little or no increase in the packaging size required for such bearings.

SUMMARY OF THE INVENTION

It is the principal object of the invention to provide a new and improved radial magnetic bearing.

It is another object of the invention to provide a radial magnetic bearing having an increased load capacity.

It is another object of the invention to provide a radial magnetic bearing having a higher load capacity than traditional radial magnetic bearings with similar packaging sizes.

An exemplary embodiment of the invention achieves at least some of the foregoing objects in a magnetic actuator core for a radial bearing that supports a rotor for rotation about an axis. The magnetic actuator core includes a back iron, and a plurality of poles spaced circumferentially about the axis and extending radially from the back iron. Each of the poles has a taper wherein the circumferential width of the pole tapers from larger to smaller as the pole extends from the back iron.

In one form of the invention, a pair of circumferentially spaced poles extend radially inward from the back iron. The poles define a coil slot extending radially inward from the back iron between the poles. The coil slot has a uniform circumferential width over substantially the entire radial length of the coil slot.

In accordance with the invention, a magnetic bearing is provided for supporting a rotor rotation about an axis. The magnetic bearing includes a plurality of actuator cores spaced circumferentially about the axis. Each of the actuator cores includes a back iron, a center pole extending radially from the back iron tip, two outer poles spaced circumferentially about the axis on opposite sides of the center pole and extending radially inward from the back iron.

In one form, a coil is wound around the center pole of each actuator core to generate a magnetic flux to support the motor. Each actuator core is characterized by the absence of a coil on either of the two outer poles.

In one form, each of the outer poles define a coil slot with the center pole of the actuator core that extends radially inward from the back iron between the outer pole and the center pole. The coil slot has a minimum circumferential width S. A circumferential gap having a circumferential width C is provided between the outer poles of circumferentially adjacent core segments, with the circumferential width C being less than the circumferential width S.

DETAILED DESCRIPTION OF THE PREFERRED EMBODIMENTS

Figure 3:
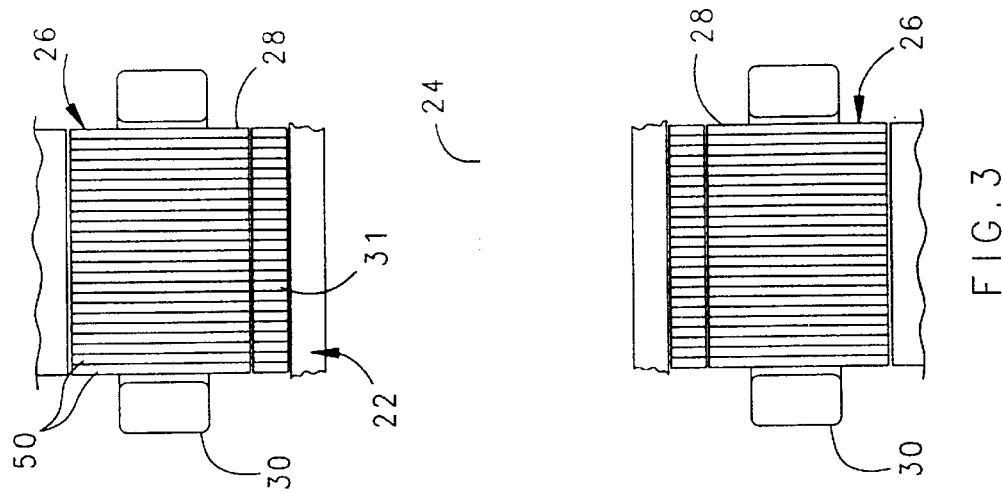
FIG. 3 is a longitudinal section view taken along line 3—3 in FIG. 2.
Figure 2:
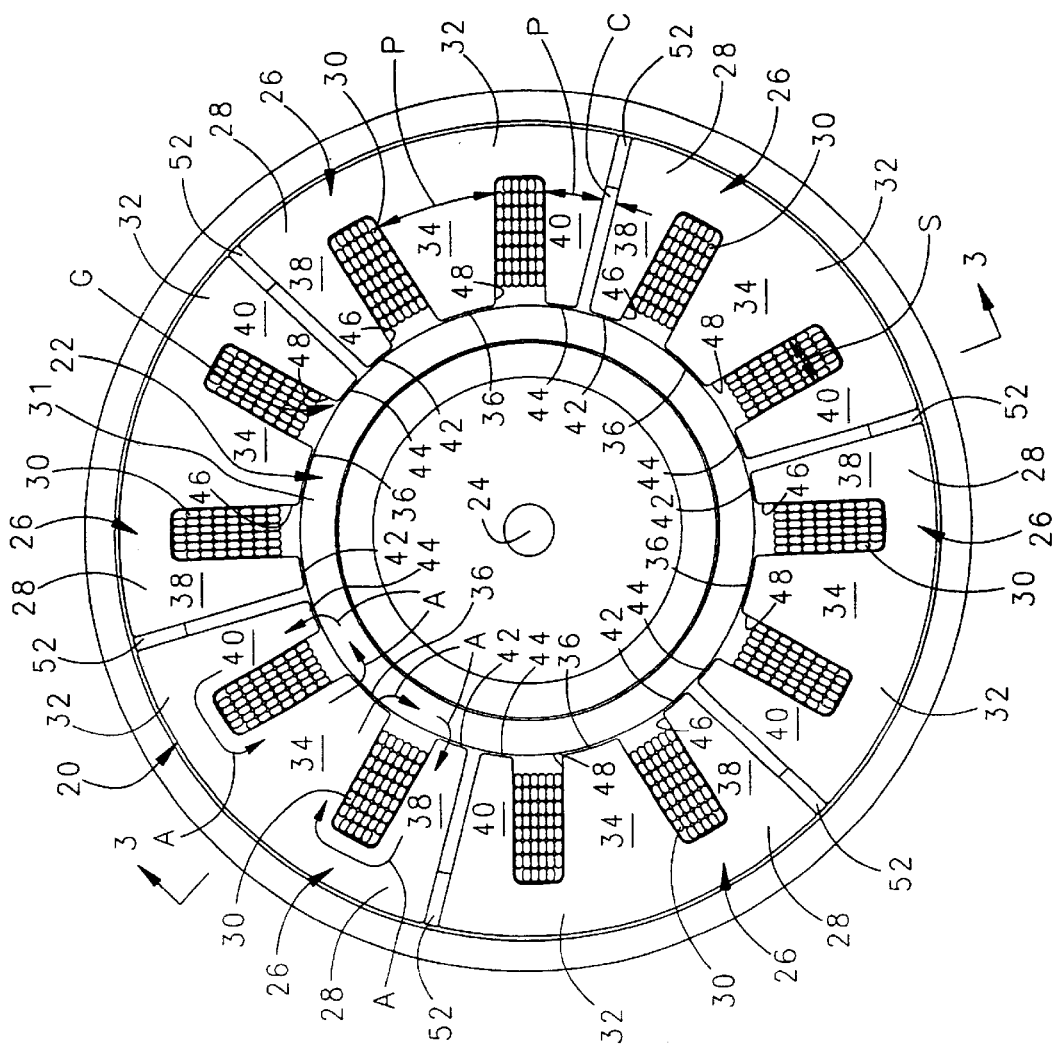
FIG. 2 is a front view of a radial magnetic bearing embodying the present invention.

As seen in FIG. 2, a magnetic bearing 20 is provided for supporting a rotor or shaft 22 for rotation about an axis 24. The bearing 20 includes a plurality of magnetic actuators 26 circumferentially spaced about the axis 24. Each of the magnetic actuators includes an E-shaped core 28 and a coil 30. The rotor 22 includes a magnetic flux carrying member 31 formed from a plurality of stacked laminations that extend circumferentially in planes transverse to the axis 24, as best seen in FIG. 3.

Each core 28 includes a back iron 32, a center pole 34 extending radially inward from the back iron 32 and terminating at a center pole tip 36, and two outer poles 38 and 40 spaced on circumferentially opposite sides of the center pole 34, and extending radially inward from the back iron 32 to terminate at respective outer pole tips 42 and 44. The poles 34, 38, 40 of each core 28 define a pair of coil slots 46 and 48 that extend radially inward from the back iron 32 between the poles 34, 38 and 34, 40. The coil slots 46, 48 have an essentially uniform circumferential width S over substantially the entire radial length of the coil slots 46 and 48. As best seen in FIG. 3, each core 26 is formed from a stack of laminations 50, each of which is E-shaped to define the poles 34, 38, and 40 and the slots 46 and 48. The laminations 50 extend circumferentially in planes transverse to the axis 24 to carry the magnetic flux in paths that are transverse to the axis 24. For each actuator 26, the coil 30 is wound in situ around the center pole 34 in the slots 46, 48. When energized, the coil 30 creates magnetic flux paths illustrated by the arrows A through the shaft 22 and the core 28. In this regard, it should be understood that the magnetic flux through the center pole 34 is split proportionally in half between the outer poles 38, 40.

Figure 4:
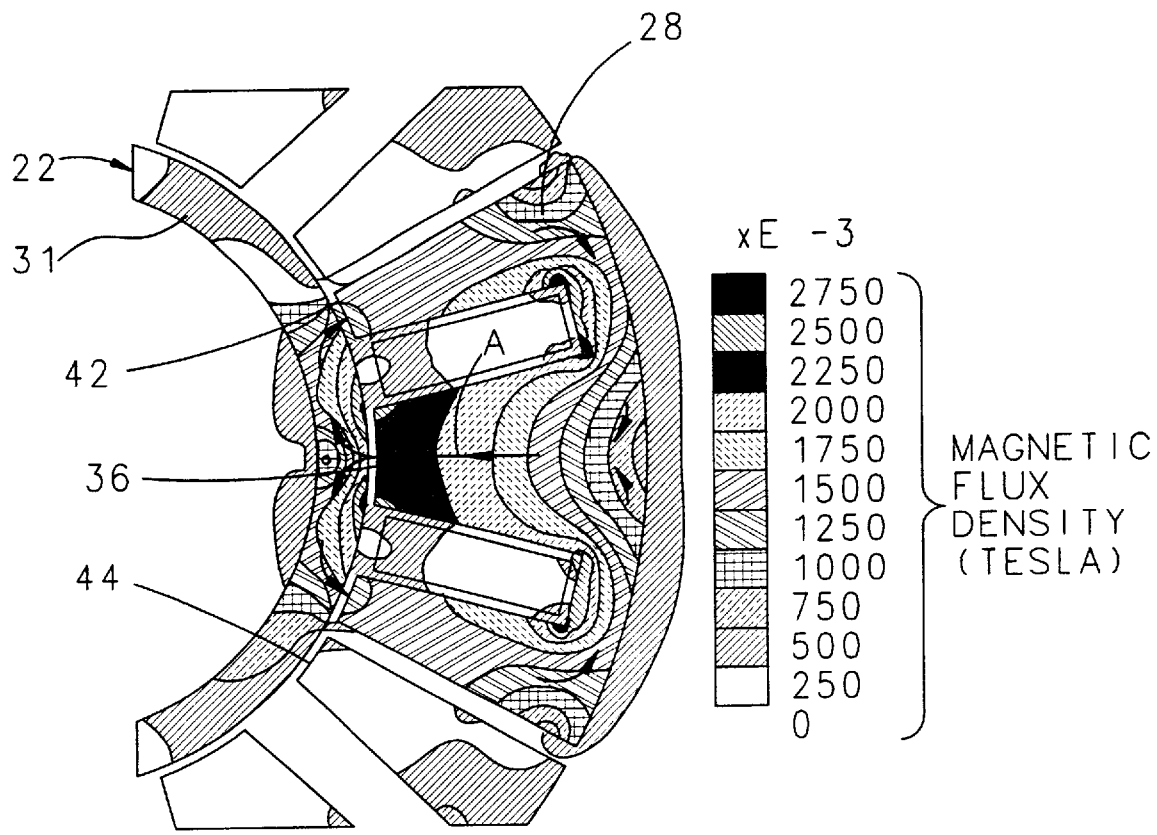
FIG. 4 is a fragmentary front view of the bearing of FIG. 2 showing the magnetic flux density of the bearing of FIG. 2.

Each of the poles 34, 36, 38 has a taper wherein the circumferential width P of the pole 34, 36, 38 tapers from larger to smaller as the pole 34, 38, 40 extends from the back iron 32. Preferably the taper of each pole 34, 36, 38 is uniform over the entire radial length of the pole. It is also preferred that the circumferential width of the center pole 34 be approximately double the circumferential width of either of the outer poles 38, 40 at any radius along the radial length of the poles 34, 38, and 40 to prevent saturation of the magnetic flux along the radial length of the center pole 34. As best seen in FIG. 4, the taper of the poles 34, 36, 38 provides a magnetic saturation point in each of the cores 28 adjacent the tips 36, 42, 44 of the poles 34,38, 40. As seen in FIG. 4, this provides the maximum flux density at the gap G between the rotor 22 and the tips 36, 42, 44. As previously discussed, because the bearing force is proportional to the square of the flux density in the gap, saturating each of the cores 26 adjacent the tips 36, 42, 44 maximizes the bearing force generated by each of the actuators 26, thereby increasing the maximum load capacity for the bearing 20. While the taper of the poles 34, 38, 40 requires that each of the coils 30 be wound in situ rather than pre-wound as with a traditional bearing, this inconvenience is more than offset by the improvement in maximum load capacity, which, based on initial analytical analysis, may be a 50% to 100% improvement in the maximum load capacity for the bearing 20 versus the traditional bearing shown in FIG. 1.

Additionally, the outer poles 38, 40 of adjacent cores 28 are separated by a circumferential gap having a circumferential width C defined by a non-magnetic spacer 52. The circumferential width C is less than the circumferential width S of the coil slots 46, 48 because each of the actuators 26 utilize the single coil 30 around the center pole 34, rather than three coils as with the traditional bearing shown in FIG. 1. Because no coil extends around the outer poles 38, 40, the circumferential width C can be minimized and the circumferential width P of each of the poles 34, 38, 40 maximized, thereby further increasing the load carrying capacity for each of the cores 26 and increasing the flux density in the gap G between the rotor 22 and the pole tips 36, 42, 44. It should be understood that the circumferential width C in the gap between the outer poles 38, 40 of adjacent actuators 26 should be of sufficient size to provide an acceptable level of magnetic isolation between each of the actuators 26. The loss of load capacity and the higher magnetic leakage to the poles 38, 40 on adjacent actuators 26 due to the lack of coils on the outer poles 38, 40 is more than offset by the increase in the circumferential widths P of the outer poles 38, 40 and the higher flux density between the center pole 34 and the rotor 22.

Figure 1:
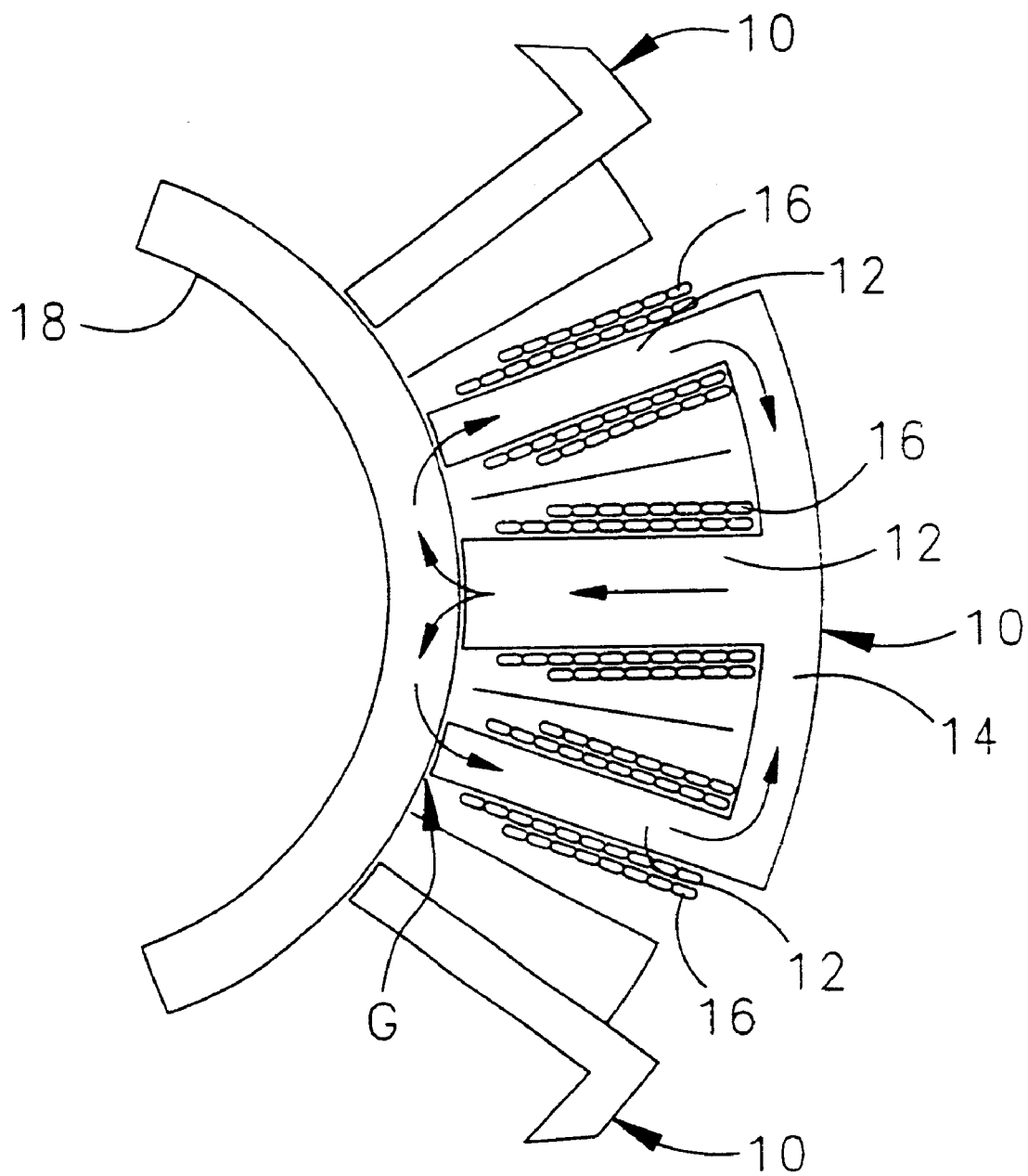
FIG. 1 is a fragmentary, front elevation of a prior art radial magnetic bearing.

It should be understood that a magnetic bearing could be formed using cores 28 with tapered poles 34, 38, 40, with a coil wound around each pole 34, 38, 40. Similarly, a magnetic bearing may be formed using a plurality of traditional, constant cross-sectional area E cores such as shown in FIG. 1, but having only a single coil 30 wound around the center pole of the traditional E core.

We claim:

1. A magnetic bearing for supporting a rotor for rotation about an axis, the magnetic bearing comprising:
    a plurality of actuator cores spaced circumferentially about the axis, each core including:
    a back iron;
    a center pole extending radially inward from the back iron tip;
    two outer poles spaced circumferentially about the axis on opposite sides of the center pole and extending radially inward from the back iron; and
    wherein each of the outer poles in combination with the center pole define a coil slot extending radially inward from the back iron between the outer pole and the center pole, each of the coil slots having a minimum circumferential width S, and wherein a circumferential gap having a circumferential width C is provided between the outer poles of circumferentially adjacent actuator cores, the circumferential width C being less than the circumferential width S.

2. A magnetic bearing for supporting a rotor for rotation about an axis, the magnetic bearing comprising:
    a plurality of actuator cores spaced circumferentially about the axis and separated by a circumferential gap, each core including:
    a laminated back iron having lamination planes extending perpendicular to the axis;
    a center pole extending radially inward from the back iron;
    two outer poles spaced circumferentially about the axis on opposite sides of the center pole and extending radially inward from the back iron; and
    a coil wound around the center pole to generate a magnetic flux to support the rotor for rotation, each of the poles having a taper wherein a circumferential width of the pole decreases from larger to smaller as the pole extends from the back iron.

3. A magnetic bearing for supporting a rotor for rotation about an axis, the magnetic bearing comprising:
    a plurality of actuator cores spaced circumferentially about the axis and separated by a circumferential gap, each core including:
    a laminated back iron having lamination planes extending perpendicular to the axis;
    a center pole extending radially inward from the back iron;
    two outer poles spaced circumferentially about the axis on opposite sides of the center pole and extending radially inward from the back iron; and
    a coil wound around the center pole to generate a magnetic flux to support the rotor for rotation; and
    wherein each of the outer poles is characterized by the absence of coils which generate a magnetic flux to support the rotor for rotation.

* * * * *